United States Patent
Zhang et al.

(10) Patent No.: US 12,347,079 B2
(45) Date of Patent: Jul. 1, 2025

(54) METHOD FOR IMAGE DEFOGGING BASED ON DARK CHANNEL PRIOR

(71) Applicant: NANJING UNIVERSITY OF POSTS AND TELECOMMUNICATIONS, Nanjing (CN)

(72) Inventors: Dengyin Zhang, Nanjing (CN); Wenjie Zhang, Nanjing (CN); Zhou Ye, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 320 days.

(21) Appl. No.: 18/312,094

(22) Filed: May 4, 2023

(65) Prior Publication Data
US 2024/0104702 A1    Mar. 28, 2024

Related U.S. Application Data

(63) Continuation of application No. PCT/CN2023/086203, filed on Apr. 4, 2023.

(30) Foreign Application Priority Data

Sep. 20, 2022   (CN) .......................... 202211143731.2

(51) Int. Cl.
*G06T 5/73* (2024.01)
*G06T 7/90* (2017.01)

(52) U.S. Cl.
CPC .................. *G06T 5/73* (2024.01); *G06T 7/90* (2017.01); *G06T 2207/10024* (2013.01); *G06T 2207/30192* (2013.01)

(58) Field of Classification Search
CPC ... G06T 5/73; G06T 7/90; G06T 2207/10024; G06T 2207/30192
(Continued)

(56) References Cited

U.S. PATENT DOCUMENTS

| 11,715,199 | B2* | 8/2023 | Li | G06V 20/52 |
| | | | | 382/128 |
| 2015/0243003 | A1* | 8/2015 | Choi | G06T 5/50 |
| | | | | 382/274 |

(Continued)

FOREIGN PATENT DOCUMENTS

| CN | 108564538 A | 9/2018 |
| CN | 109919879 A | 6/2019 |

(Continued)

*Primary Examiner* — Ali Bayat
(74) *Attorney, Agent, or Firm* — Nitin Kaushik

(57) ABSTRACT

An image defogging method based on dark channel prior is provided, including: acquiring a dark channel image and a light channel image of a haze weather image according to a haze weather image; selecting pixel values in the light channel image and calculating an atmospheric light value A; obtaining a transmittance image based on the light channel image and the atmospheric light value A; obtaining a restored image of defogging based on the transmittance image and the atmospheric light value A. By using the pixel values of the light channel to distinguish whether pixel points comply with the dark channel prior, calculating the transmittance of image areas that comply with the dark channel prior and those that do not, so as to avoid the situation where the image defogging effect is not good due to inaccurate transmittance estimation, making the defogging of images containing high brightness areas more clear.

7 Claims, 2 Drawing Sheets

(58) Field of Classification Search
USPC .......................................................... 382/274
See application file for complete search history.

(56) References Cited

U.S. PATENT DOCUMENTS

| | | | |
|---|---|---|---|
| 2015/0332437 A1* | 11/2015 | Kondou | G06T 5/00 |
| | | | 382/190 |
| 2015/0371373 A1* | 12/2015 | Shin | G06T 5/90 |
| | | | 382/274 |
| 2017/0316551 A1* | 11/2017 | Hong | G06T 5/20 |
| 2018/0122051 A1 | 5/2018 | Li et al. | |

FOREIGN PATENT DOCUMENTS

| | | |
|---|---|---|
| CN | 114565539 A | 5/2022 |
| CN | 114693542 A | 7/2022 |
| CN | 115482165 A | 12/2022 |
| CN | 115578280 A | 1/2023 |

* cited by examiner

METHOD FOR IMAGE DEFOGGING BASED ON DARK CHANNEL PRIOR

CROSS-REFERENCE TO RELATED APPLICATIONS

The application claims priority to Chinese patent application No. 202211143731.2, filed on Sep. 20, 2022, the entire contents of which are incorporated herein by reference.

TECHNICAL FIELD

The present disclosure relates to the field of image processing technology, in particular to a method for image defogging based on a dark channel prior.

BACKGROUND

At present, image defogging algorithms can be mainly divided into three types. The first type is a defogging method based on image enhancement, which do not consider the causes of image degradation, but enhance the contrast of fog images through image enhancement methods. Although the results meet human visual requirements, some information will be lost. The second type is a defogging method based on atmospheric scattering model for image restoration. This method estimates the parameters of the atmospheric scattering model based on some prior knowledge of the fog-free image, and then restores the fog-free image. The processed image of this method is clearer and more natural, with less detail loss, but different prior knowledge has limitations in their respective application scenarios. In addition, if the parameter estimation is not accurate, it directly affects the final effect. The third type is a defogging method based on deep learning, and this method in the early stages used convolutional neural networks to estimate the parameters of the atmospheric scattering model and restore fog-free images.

The current popular method is end-to-end image defogging, which directly obtains fog-free images through convolutional neural networks. This method does not have prior knowledge limitations and can achieve ideal results when the network is well trained. However, the common problem based on deep learning methods is that due to the use of synthetic fog images during network training, the final result may perform better on synthetic fog images, but it performs poorly on real fog images. Besides, it also has the problem of slow training speed.

The information disclosed in the technical part of the background is only intended to increase an understanding of the overall background of the present disclosure, and should not be regarded as acknowledging or implying in any form that the information constitutes prior art that is already well-known to ordinary skilled person in the art.

SUMMARY

The object of the present disclosure is to overcome the defects of existing techniques and provide a method for image defogging based on dark channel prior, which solves the technical problem of inaccurate estimation of atmospheric light values in high brightness areas or dense fog images using defogging processing methods based on atmospheric scattering model image restoration, as well as inaccurate estimation of transmittance due to high brightness areas not meeting the condition of zero dark channel values.

To achieve the above object/solve the above technical problem, the present disclosure is implemented using the following technical solution:

acquiring a dark channel image and a light channel image of a haze weather image according to the haze weather image;

selecting pixel values in the light channel image and calculating an atmospheric light value A;

obtaining a transmittance image based on the light channel image and the atmospheric light value A; and obtaining a restored image of defogging based on the transmittance image and the atmospheric light value A.

Further, the step of acquiring the dark channel image and the light channel image of the haze weather image including:

taking a minimum value of pixel points in R, G, and B three channels of an input image to obtain the dark channel image, and taking a minimum value in a neighborhood of the pixel points, calculating dark channel pixel values of the haze weather image through formula (1), $$J_d(x) = \min_{y \in \Omega(x)} ( \min_{c \in \{r,g,b\}} J^c(y)); \quad (1)$$

wherein, c represents a certain channel of R, G, and B three channels, $J^c$ represents pixel values of each channel in a color image, $\Omega(x)$ represents a window centered on pixel X, and a size of the window is a size of the neighborhood;

taking a maximum value of the pixel points in the R, G, and B three channels of the input image to obtain the light channel image, and taking a maximum value in the neighborhood of the pixel points; and calculating light channel pixel values of the haze weather image through formula (2), $$J_l(x) = \max_{y \in \Omega(x)} ( \max_{c \in \{r,g,b\}} J^c(y)). \quad (2)$$

Further, the neighborhood size is 15×15.

Further, the step of selecting pixel values in the light channel image and calculating the atmospheric light value A, including:

selecting pixel values within a preset range in the light channel pixel values; and averaging the selected pixel points to obtain the atmospheric light value A.

Further, the step of the atmospheric light value A has an upper limit value $A_0$, and the upper limit value $A_0$ of the atmospheric light value A is 225.

Further, the step of obtaining the transmittance image based on the light channel image and the atmospheric light value A, including:

comparing the calculated light channel pixel values with the calculated atmospheric light value A to obtain a prior value $J_{dl}(x)$ between the dark channel pixel values and the light channel pixel values, an expression of the prior value $J_{dl}(x)$ is:

$$J_{dl}(x) = \begin{cases} \min_{y \in \Omega(x)} \left( \max_{c \in \{r,g,b\}} J^c(y) \right), & J_l < A \\ \max_{y \in \Omega(x)} \left( \max_{c \in \{r,g,b\}} J^c(y) \right), & J_l \geq A \end{cases};$$

wherein pixels in sky areas or high brightness areas of the haze weather image, at least one color channel has a pixel value close to 255, a prior value 255 of the high brightness areas is obtained, and the dark channel pixel values are $J_d(x) \to 0$; the light channel pixel values are $J_l(x) \to 255$;

substituting the obtained prior value into a atmospheric scattering model to calculate the transmittance image, the atmospheric scattering model is:

$$I(x)=J(x)t(x)+A(1-t(x)),$$

wherein, $I(x)$ represents the input image; $J(x)$ represents a clear image; $A$ is the atmospheric light value; $t(x)$ represents the transmittance image;

an obtained transmittance image in dark areas is:

$$t_d(x) = 1 - \min_{y \in \Omega(x)}\left(\min_{c \in \{r,g,b\}} \frac{I^c}{A}\right);$$

an obtained transmittance image in the high brightness areas is:

$$t_l(x) = \frac{\max_{y \in \Omega(x)}\left(\max_{c \in \{r,g,b\}} I^c(y)\right) - A}{255 - A};$$

introducing a factor $\omega$ for optimizing images in $t(x)$, the transmittance image is:

$$t(x) = \begin{cases} t_d(x) = 1 - \omega \min_{y \in \Omega(x)}\left(\max_{c \in \{r,g,b\}} \frac{I^c}{A}\right), & J_l < A \\ t_l(x) = 1 - \omega \dfrac{A_0 - \omega \max_{y \in \Omega(x)}\left(\max_{c \in \{r,g,b\}} J^c(y)\right)}{255 - A}, & J_l \geq A \end{cases};$$

performing threshold processing on the transmittance image.

Further, a value range of the factor $\omega$ is [0,1].

Further, the step of performing threshold processing on the transmittance image, including:

setting a threshold $t_0$, wherein $t_0=0.1$ based on experience, and use $t_0$ as a transmittance when a value of $t(x)$ is less than $t_0$.

Further, the step of obtaining the restored image of defogging based on the transmittance image and the atmospheric light value A, including:

substituting the transmittance $t(x)$ and the atmospheric light value A into the atmospheric scattering model to obtain the restored image of defogging.

Further, a calculation formula for the restored image of defogging is:

$$J(x) = \begin{cases} \dfrac{I(x) - A}{\max(t_d(x), t_0)} + A, & J_l < A \\ \dfrac{I(x) - A}{\max(t_l(x), t_0)} + A, & J_l \geq A \end{cases}.$$

Compared with the prior art, the advantageous effects achieved by the present disclosure are as following:

The present disclosure distinguishes whether pixel points comply with the dark channel prior by using the pixel values of the light channel, and calculates the transmittance of image areas that comply with the dark channel prior and those that do not. This avoids the situation where the image defogging effect is not good due to inaccurate transmittance estimation, and makes the defogging of images containing high brightness areas and sky areas more realistic and clear, so as to solve the technical problem of inaccurate estimation of atmospheric light values in high brightness areas or dense fog images using the current defogging processing method based on atmospheric scattering model image restoration, as well as inaccurate estimation of transmittance due to high brightness areas not meeting the condition of zero dark channel values.

The present disclosure replaces the original atmospheric light intensity value by setting an upper limit value for the atmospheric light value, avoiding the problem of the original atmospheric light intensity value being easily disturbed by bright white areas.

DETAILED DESCRIPTION OF THE EMBODIMENTS

Figure 1:
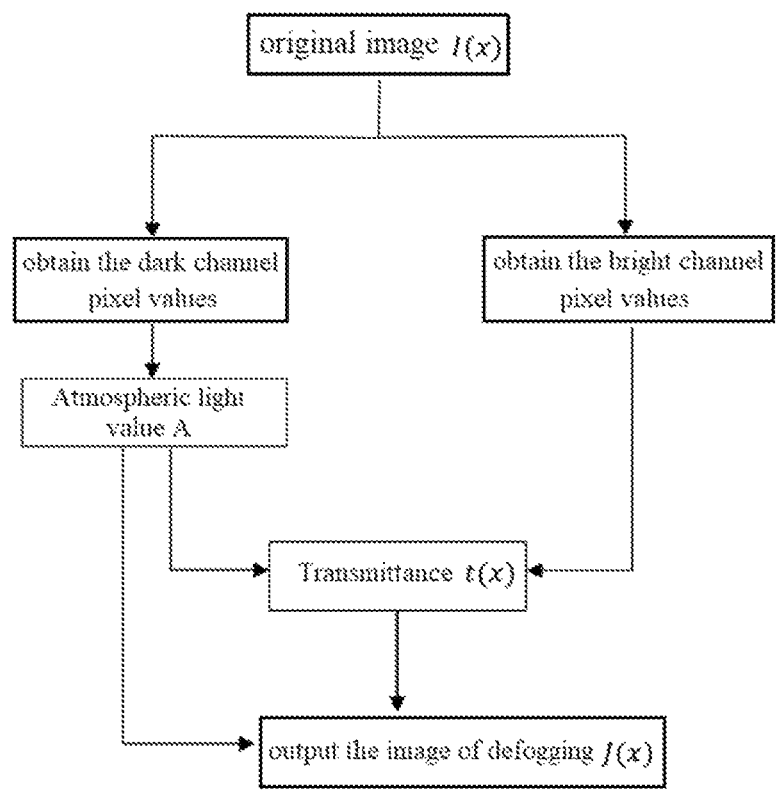
FIG. 1 is a flowchart of an image defogging method based on a dark channel prior provided by an embodiment of the present disclosure.
Figure 2:
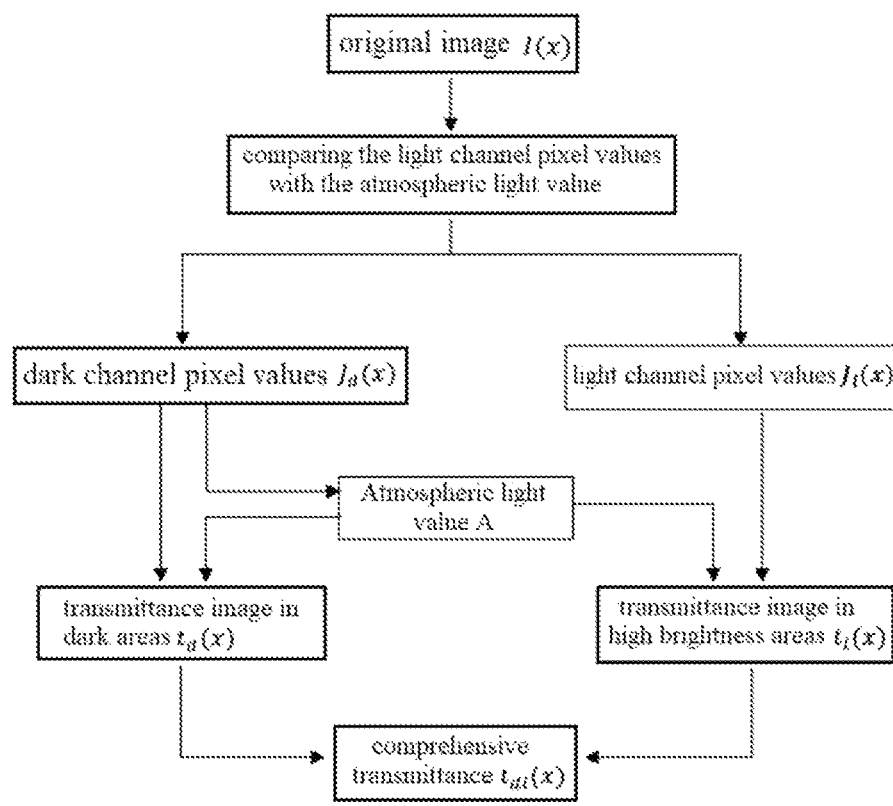
FIG. 2 is a schematic diagram showing of the transmission calculation process of the image defogging method based on the dark channel prior provided by the embodiment of the present disclosure.

The present disclosure is further described below in conjunction with the accompanying drawings. The following embodiments are only intended to provide a clearer illustration of the technical solution of the present disclosure, and cannot be used to limit the scope of the present disclosure.

An image defogging method based on a dark channel prior, including

Inputting a haze weather image, and then acquiring the dark channel image and the light channel image of the haze weather image. Specifically, taking the minimum value of pixel points in R, G, and B three channels of the input image to obtain the dark channel image, and the minimum value is taken in the neighborhood 15×15 of the pixel points. The dark channel pixel values of the haze weather image is calculated through formula (1):

$$J_d(x) = \min_{y \in \Omega(x)}(\min_{c \in \{r,g,b\}} J^c(y)). \tag{1}$$

Wherein, c represents a certain channel of R, G, and B three channels, $J^c$ represents pixel values of each channel in a color image, $\Omega(x)$ represents a window centered on pixel X, and the size of the window is the size of the neighborhood.

Taking the maximum value of the pixel points in the R, G, and B three channels of the input image to obtain the light channel image, and the maximum value is taken in the neighborhood 15×15 of the pixel points. The light channel pixel values of the haze weather image is calculated through formula (2):

$$J_l(x) = \min_{y \in \Omega(x)}(\min_{c \in \{r,g,b\}} J^c(y)). \tag{2}$$

Selecting pixel values in the light channel image and calculating the atmospheric light value A. Specifically, selecting the top 10% pixel values in the light channel pixel values. For images with larger or smaller brightness areas, the selection ratio can be appropriately increased or decreased. Averaging the selected pixel points, the atmospheric light value A has an upper limit value $A_0$, $A_0=225$, so that it can avoid the brightness areas affecting the atmospheric light intensity value. The pixels in sky areas or high brightness areas of the haze weather image, at least one color channel has a pixel value close to 255, and a prior value 255 of the high brightness areas is obtained.

Obtaining the transmittance image based on the light channel image and the atmospheric light value A. Specifically, comparing the calculated light channel pixel values with the calculated atmospheric light value A to obtain a prior value $J_{dl}(x)$ between the dark channel pixel values and the light channel pixel values, and the expression of the prior value $J_{dl}(x)$ is:

$$J_{dl}(x) = \begin{cases} \min_{y \in \Omega(x)} \left( \min_{c \in \{r,g,b\}} J^c(y) \right), & J_l < A \\ \min_{y \in \Omega(x)} \left( \min_{c \in \{r,g,b\}} J^c(y) \right), & J_l \geq A \end{cases}.$$

The dark channel pixel values are $J_d(x) \to 0$; the light channel pixel values are $J_l(x) \to 255$;

Substituting the obtained prior value into a atmospheric scattering model to calculate the transmittance image. The atmospheric scattering model is:

$I(x)=J(x)t(x)+A(1-t(x))$.

Wherein, I(x) represents the input image; J(x) represents a represents a clear image; A is the atmospheric light value; and t(x) represents the transmittance image.

The obtained transmittance image in dark areas is:

$$t_d(x) = 1 - \min_{y \in \Omega(x)} \left( \min_{c \in \{r,g,b\}} \frac{I^c}{A} \right).$$

The obtained transmittance image in the high brightness areas is:

$$t_l(x) = \frac{\min_{y \in \Omega(x)} \left( \min_{c \in \{r,g,b\}} J^c(y) \right) - A}{225 - A}.$$

In real life, even on clear days with white clouds, there are still some particles in the air. Therefore, the influence of fog can still be felt when looking at distant objects. In addition, the presence of fog makes humans feel the presence of depth of field. Therefore, it is necessary to retain a certain degree of fog when removing fog. So a factor ω in t(x) is introduced for optimizing images, wherein the value range of the factor ω is [0,1]. Finally, the comprehensive transmittance including the failure area of the dark channel is obtained, and the expression is as follows:

$$t(x) = \begin{cases} t_d(x) = 1 - \omega \min_{y \in \Omega(x)} \left( \min_{c \in \{r,g,b\}} \frac{I^c}{A} \right), & J_l < A \\ t_l(x) = 1 - \omega \frac{255 - \min_{y \in \Omega(x)} \left( \min_{c \in \{r,g,b\}} J^c(y) \right)}{225 - A}, & J_l \geq A \end{cases}.$$

Substituting the transmittance t(x) and the atmospheric light value A into the atmospheric scattering model to obtain the restored image of defogging.

Performing threshold processing on the transmittance image, specifically, when the value t(x) is too small, it can cause the restored image to have larger pixels, resulting in an image that is too white. Therefore, it is necessary to limit the minimum value. Setting a threshold $t_0$, wherein $t_0=0.1$ based on experience, and use to as a transmittance when the value of t(x) is less than $t_0$.

The transmittance t(x) obtained based on the prior values of the bright channel pixel values and the dark channel pixel values, as well as the atmospheric light value, are substituted into the atmospheric scattering model to obtain the calculation formula for the restored image of defogging:

$$J(x) = \begin{cases} \frac{I(x) - A}{\max(t_d(x), t_0)} + A, & J_l < A \\ \frac{I(x) - A}{\max(t_l(x), t_0)} + A, & J_l \geq A \end{cases}.$$

And then outputting the restored image of defogging.

The above are only the preferred embodiments of the present disclosure. It should be understood that for ordinary skilled person in art, several modifications and variants can be made without departing from the technical principles of the present disclosure. These modifications and variants should also be considered as the scope of the present disclosure.

What is claimed is:

1. A method for image defogging based on a dark channel prior, comprising:
    acquiring a dark channel image and a light channel image of a haze weather image according to the haze weather image; wherein acquiring the dark channel image and the light channel image of the haze weather image comprising:
    taking a minimum value of pixel points in R, G, and B three channels of an input image to obtain the dark channel image, and taking a minimum value in a neighborhood of the pixel points,
    calculating dark channel pixel values of the haze weather image through formula (1);

$$J_d(x) = \min_{y \in \Omega(x)} \left( \min_{c \in \{r,g,b\}} J^c(y) \right); \quad (1)$$

wherein, c represents a certain channel of R, G, and B three channels, $J^c$ represents pixel values of each channel in a color image, $\Omega(x)$ represents a window centered on pixel X, and a size of the window is a size of the neighborhood;
taking a maximum value of the pixel points in the R, G, and B three channels of the input image to obtain the light channel image, and taking a maximum value in the neighborhood of the pixel points;
calculating light channel pixel values of the haze weather image through formula (2), $$J_l(x) = \min_{y \in \Omega(x)} \left( \min_{c \in \{r,g,b\}} J^c(y) \right); \quad (2)$$

selecting pixel values in the light channel image and calculating an atmospheric light value A; wherein selecting pixel values in the light channel image and calculating the atmospheric light value A, comprising:
  selecting pixel values within a preset range in the light channel pixel values;
  averaging the selected pixel points to obtain the atmospheric light value A;
obtaining a transmittance image based on the light channel image and the atmospheric light value A; wherein obtaining the transmittance image based on the light channel image and the atmospheric light value A, comprising:
  comparing the calculated light channel pixel values with the calculated atmospheric light value A to obtain a prior value $J_{dl}(x)$ between the dark channel pixel values and the light channel pixel values, an expression of the prior value $J_{dl}(x)$ is:

$$J_{dl}(x) = \begin{cases} \min_{y \in \Omega(x)}\left(\min_{c \in \{r,g,b\}} J^c(y)\right), & J_l < A \\ \min_{y \in \Omega(x)}\left(\min_{c \in \{r,g,b\}} J^c(y)\right), & J_l \geq A \end{cases};$$

wherein pixels in sky areas or high brightness areas of the haze weather image, at least one color channel has a pixel value close to 255, a prior value 255 of the high brightness areas is obtained, and the dark channel pixel values are $J_d(x) \to 0$; the light channel pixel values are $J_l(x) \to 255$;
  substituting the obtained prior value into a atmospheric scattering model to calculate the transmittance image, the atmospheric scattering model is:

$I(x) = J(x)t(x) + A(1 - t(x))$.

wherein, J(x) represents the input image; J(x) represents a clear image; A is the atmospheric light value; t(x) represents the transmittance image;
  an obtained transmittance image in dark areas is:

$$t_d(x) = 1 - \min_{y \in \Omega(x)}\left(\min_{c \in \{r,g,b\}} \frac{I^c}{A}\right);$$

an obtained transmittance image in the high brightness areas is:

$$t_l(x) = \frac{\min_{y \in \Omega(x)}\left(\min_{c \in \{r,g,b\}} J^c(y)\right) - A}{255 - A};$$

introducing a factor ω for optimizing images in t(x), the transmittance image is:

$$t(x) = \begin{cases} t_d(x) = 1 - \omega \min_{y \in \Omega(x)}\left(\min_{c \in \{r,g,b\}} \frac{I^c}{A}\right), & J_l < A \\ t_l(x) = 1 - \omega \frac{A_0 - \min_{y \in \Omega(x)}\left(\min_{c \in \{r,g,b\}} J^c(y)\right)}{225 - A}, & J_l \geq A \end{cases};$$

performing threshold processing on the transmittance image;
  obtaining a restored image of defogging based on the transmittance image and the atmospheric light value A.

2. The method for image defogging based on the dark channel prior according to claim 1, wherein the neighborhood size is 15×15.

3. The method for image defogging based on the dark channel prior according to claim 1, wherein the atmospheric light value A has an upper limit value $A_0$, and the upper limit value $A_0$ of the atmospheric light value A is 225.

4. The method for image defogging based on the dark channel prior according to claim 1, wherein a value range of the factor ω is [0,1].

5. The method for image defogging based on the dark channel prior according to claim 1, wherein performing threshold processing on the transmittance image, comprising:
  setting a threshold $t_0$, wherein $t_0$, =0.1 based on experience, and use $t_0$, as a transmittance when a value of t(x) is less than $t_0$.

6. The method for image defogging based on the dark channel prior according to claim 1, wherein obtaining the restored image of defogging based on the transmittance image and the atmospheric light value A, comprising:
  substituting the transmittance t(x) and the atmospheric light value A into the atmospheric scattering model to obtain the restored image of defogging.

7. The method for image defogging based on the dark channel prior according to claim 6, wherein a calculation formula for the restored image of defogging is:

$$J(x) = \begin{cases} \frac{I(x) - A}{\max(t_d(x), t_0)} + A, & J_l < A \\ \frac{I(x) - A}{\max(t_l(x), t_0)} + A, & J_l \geq A \end{cases}.$$

* * * * *